United States Patent
Choltco-Devlin (10) Patent No.: US 12,227,262 B2
(45) Date of Patent: Feb. 18, 2025

(54) MID-SPROCKET ASSEMBLY

(71) Applicant: Fox Factory, Inc., Duluth, GA (US)

(72) Inventor: Evan Michael Choltco-Devlin, North Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 718 days.

(21) Appl. No.: 16/706,042

(22) Filed: Dec. 6, 2019

(65) Prior Publication Data

US 2020/0172198 A1    Jun. 4, 2020

Related U.S. Application Data (60) Provisional application No. 62/776,983, filed on Dec. 7, 2018.

(51) Int. Cl.
| | | |
|---|---|---|
| *B62M 11/06* | (2006.01) | |
| *B62M 1/36* | (2013.01) | |
| *B62M 9/00* | (2006.01) | |
| *B62M 9/06* | (2006.01) | |
| *B62M 6/40* | (2010.01) | |

(52) U.S. Cl.
CPC ............. *B62M 11/06* (2013.01); *B62M 9/06* (2013.01); *B62M 1/36* (2013.01); *B62M 6/40* (2013.01); *B62M 2009/005* (2013.01); *B62M 2009/007* (2013.01)

(58) Field of Classification Search
CPC .......... B62M 11/06; B62M 9/06; B62M 1/36; B62M 6/40; B62M 2009/005; B62M 2009/007
See application file for complete search history.

(56) References Cited

U.S. PATENT DOCUMENTS

| | | | |
|---|---|---|---|
| 2,451,690 A | | 10/1948 | Oehler |
| 2,468,011 A | * | 4/1949 | Fisette ............... A63G 1/12 472/24 |
| 2,793,571 A | | 5/1957 | Way et al. |
| 3,168,836 A | | 2/1965 | Militana |
| 3,200,665 A | | 8/1965 | Martin |
| 3,272,027 A | | 9/1966 | Wayman |
| 3,304,796 A | | 2/1967 | Leege |
| 3,371,549 A | | 3/1968 | Ernst |

(Continued)

FOREIGN PATENT DOCUMENTS

| | | |
|---|---|---|
| CA | 2964058 A1 | 10/2017 |
| CN | 1830722 A | 9/2006 |

(Continued)

OTHER PUBLICATIONS

Proximate definition, Dictionary.com, Sep. 28, 2022 (Year: 2022).

(Continued)

*Primary Examiner* — Anne Marie M Boehler (57) ABSTRACT

A mid-sprocket assembly is disclosed herein. The mid-sprocket assembly includes an input shaft to receive an input force, the input shaft having a plurality of input shaft gears coupled therewith. A countershaft having a plurality of countershaft gears coupled therewith, at least one of the plurality of countershaft gears selectively and axially engaged to receive the input force from at least one input shaft gears and provide the input force to a rear wheel to drive the rear wheel.

14 Claims, 6 Drawing Sheets

(56) References Cited

U.S. PATENT DOCUMENTS

| | | |
|---|---|---|
| 3,815,439 A | 6/1974 | Tarutani |
| 3,903,754 A | 9/1975 | Morroni |
| 3,905,248 A | 9/1975 | Peyrard |
| 3,987,539 A | 10/1976 | Gravener |
| 4,144,773 A | 3/1979 | Addicks |
| 4,174,642 A | 11/1979 | Martin et al. |
| 4,240,303 A | 12/1980 | Mosley |
| 4,261,214 A | 4/1981 | Watanabe et al. |
| RE30,758 E | 10/1981 | Lang |
| 4,318,310 A | 3/1982 | Segawa |
| 4,331,043 A | 5/1982 | Shimano |
| 4,358,967 A | 11/1982 | Kastan |
| 4,392,841 A | 7/1983 | Juy |
| 4,439,172 A | 3/1984 | Segawa |
| 4,446,753 A | 5/1984 | Nagano |
| 4,453,924 A | 6/1984 | Sugino |
| 4,475,894 A | 10/1984 | Sugino |
| 4,545,691 A | 10/1985 | Kastan et al. |
| 4,583,422 A | 4/1986 | Boyd |
| 4,586,914 A | 5/1986 | Nagano |
| 4,594,910 A | 6/1986 | Nagano |
| 4,598,608 A | 7/1986 | Ueno |
| 4,608,878 A | 9/1986 | Shimano |
| 4,722,722 A | 2/1988 | Rampe |
| 4,867,733 A | 9/1989 | Yamanoi et al. |
| 4,889,521 A | 12/1989 | Nagano |
| 5,003,840 A | 4/1991 | Hinschlager |
| 5,192,248 A | 3/1993 | Nagano |
| 5,192,249 A | 3/1993 | Nagano |
| 5,224,903 A | 7/1993 | Langhof et al. |
| 5,226,469 A | 7/1993 | Matsumura et al. |
| 5,246,402 A | 9/1993 | Romano |
| 5,285,701 A | 2/1994 | Parachinni |
| 5,362,278 A | 11/1994 | Bergles et al. |
| 5,413,534 A | 5/1995 | Nagano |
| 5,451,198 A | 9/1995 | Lancaster |
| 5,738,603 A | 4/1998 | Schmidt et al. |
| 5,830,096 A | 11/1998 | Schmidt et al. |
| 5,852,954 A | 12/1998 | Yamanaka |
| 5,908,364 A | 6/1999 | Tanaka |
| 5,935,033 A | 8/1999 | Tseng et al. |
| 5,947,852 A | 9/1999 | Moretz |
| 5,984,817 A | 11/1999 | Schulz |
| 6,007,442 A | 12/1999 | Schmidt |
| 6,013,001 A | 1/2000 | Miyoshi |
| 6,022,284 A | 2/2000 | Bartolozzi et al. |
| 6,102,821 A | 8/2000 | Nakamura |
| 6,202,506 B1 | 3/2001 | Storck et al. |
| 6,203,462 B1 | 3/2001 | Takamori |
| 6,564,675 B1 | 5/2003 | Jiang |
| 6,572,500 B2 | 6/2003 | Tetsuka |
| 6,656,072 B2 | 12/2003 | Sugita et al. |
| 6,666,786 B2 | 12/2003 | Yahata |
| 6,755,095 B2 | 6/2004 | Yamanaka |
| 6,860,171 B1 | 3/2005 | Nanko et al. |
| 7,080,574 B2 | 7/2006 | Chang |
| 7,263,914 B2 | 9/2007 | Ording et al. |
| 7,267,030 B2 | 9/2007 | French |
| 7,462,120 B1 | 12/2008 | Thompson |
| 7,503,864 B2 | 3/2009 | Nonoshita et al. |
| 7,530,290 B2 | 5/2009 | Lin |
| 7,610,832 B2 | 11/2009 | Guiseppe et al. |
| 7,686,721 B2 | 3/2010 | Tabe et al. |
| 7,699,733 B2 | 4/2010 | Sakura et al. |
| 7,713,156 B2 | 5/2010 | Sakura et al. |
| 7,753,815 B2 | 7/2010 | Saifuddin et al. |
| 7,824,287 B2 | 11/2010 | Nonoshita et al. |
| 7,850,564 B2 | 12/2010 | Nonoshita |
| 7,883,437 B2 | 2/2011 | Braedt |
| 7,942,771 B2 | 5/2011 | Kamada |
| 7,967,709 B2 | 6/2011 | Emura et al. |
| 8,025,304 B2 | 9/2011 | Smith |
| 8,057,338 B2 | 11/2011 | Kamada |
| 8,070,632 B2 | 12/2011 | Yuan |
| 8,096,908 B2 | 1/2012 | Oishi et al. |
| 8,226,511 B2 | 7/2012 | Kamada |
| 8,298,104 B2 | 10/2012 | Sakura |
| 8,479,610 B2 | 7/2013 | Valle et al. |
| 8,550,944 B2 | 10/2013 | Esquibel |
| 8,573,093 B2 | 11/2013 | Valle et al. |
| 8,616,084 B2 | 12/2013 | Meggiolan |
| 8,820,192 B2 | 9/2014 | Staples et al. |
| 8,882,619 B2 | 11/2014 | Braedt |
| 8,888,631 B2 | 11/2014 | Morita |
| 9,016,169 B2 | 4/2015 | Sugimoto et al. |
| 9,033,835 B2 | 5/2015 | Blank et al. |
| 9,302,733 B2 | 4/2016 | Schlanger |
| 9,302,736 B2 | 4/2016 | Iwai et al. |
| 9,308,967 B2 | 4/2016 | Braedt |
| 9,328,814 B2 | 5/2016 | Wesling et al. |
| 9,415,835 B2 | 8/2016 | Tokuyama et al. |
| 9,440,706 B2 | 9/2016 | Iwai et al. |
| 9,463,844 B2 | 10/2016 | Fukunaga |
| 9,493,211 B2 | 11/2016 | Reiter et al. |
| 9,540,070 B2 | 1/2017 | Watarai et al. |
| 9,580,144 B2 | 2/2017 | Bernardele |
| 9,631,714 B2 | 4/2017 | Watarai et al. |
| 9,677,658 B2 | 6/2017 | Wickliffe |
| 9,719,590 B2 | 8/2017 | Reiter et al. |
| 9,725,133 B2 | 8/2017 | Staples et al. |
| 9,791,033 B2 | 10/2017 | Wickliffe et al. |
| 9,869,382 B2 | 1/2018 | Wesling et al. |
| 9,914,502 B2 | 3/2018 | Wu |
| 9,919,763 B2 | 3/2018 | Iwai et al. |
| 9,926,038 B2 | 3/2018 | Fukunaga et al. |
| 9,932,090 B2 | 4/2018 | Yoshida et al. |
| 9,944,351 B2 | 4/2018 | Braun et al. |
| 9,963,196 B2 | 5/2018 | Sugimoto |
| 9,994,285 B2 | 6/2018 | Tokuyama et al. |
| 10,040,510 B2 | 8/2018 | Sugimoto et al. |
| 10,053,186 B2 | 8/2018 | Braedt et al. |
| 10,059,400 B2 | 8/2018 | Tokuyama et al. |
| 10,155,566 B2 | 12/2018 | Sugimoto |
| 10,221,887 B2 | 3/2019 | Dubois et al. |
| 10,358,186 B2 | 7/2019 | Sugimoto |
| 10,359,106 B2 | 7/2019 | Akanishi |
| 10,359,107 B2 | 7/2019 | Young |
| 10,377,445 B2 | 8/2019 | Hirose et al. |
| 10,407,127 B2 | 9/2019 | Sugimoto |
| 10,443,685 B2 | 10/2019 | Reiter |
| 10,507,888 B2 | 12/2019 | Sugimoto |
| 10,550,925 B2 | 2/2020 | Akanishi |
| 10,562,589 B2 | 2/2020 | Sugimoto et al. |
| 10,578,201 B2 | 3/2020 | Reiter et al. |
| 10,800,482 B2 | 10/2020 | Staples et al. |
| 10,864,963 B2 | 12/2020 | Staples et al. |
| 10,994,804 B2 | 5/2021 | Sugimoto |
| 11,014,628 B2 | 5/2021 | Choltco-Devlin et al. |
| 11,130,546 B2 | 9/2021 | Staples et al. |
| 11,505,277 B1 | 11/2022 | Yamanaka |
| 2002/0086753 A1 | 7/2002 | Yahata |
| 2003/0097900 A1 | 5/2003 | Yamanaka |
| 2003/0199351 A1 | 10/2003 | Nichols |
| 2004/0070166 A1 | 4/2004 | Valle |
| 2004/0092352 A1 | 5/2004 | Chiang |
| 2004/0200314 A1 | 10/2004 | Hermansen et al. |
| 2004/0204274 A1 | 10/2004 | Young |
| 2005/0009656 A1 | 1/2005 | Preis et al. |
| 2005/0014590 A1 | 1/2005 | Wen |
| 2005/0032596 A1 | 2/2005 | Nonoshita et al. |
| 2005/0039570 A1 | 2/2005 | Nanko et al. |
| 2005/0072264 A1 | 4/2005 | Yamanaka |
| 2005/0081678 A1 | 4/2005 | Smith |
| 2005/0090349 A1 | 4/2005 | Lee |
| 2005/0199092 A1 | 9/2005 | Feltrin et al. |
| 2005/0233850 A1 | 10/2005 | Andel |
| 2005/0282671 A1 | 12/2005 | Emura et al. |
| 2005/0282672 A1 | 12/2005 | Nonoshita |
| 2006/0205549 A1 | 9/2006 | Nonoshita et al. |
| 2006/0210734 A1 | 9/2006 | Lin |
| 2006/0288819 A1 | 12/2006 | Dal et al. |
| 2007/0034043 A1 | 2/2007 | Feltrin |
| 2007/0049437 A1 | 3/2007 | Wickliffe |
| 2007/0054768 A1 | 3/2007 | Miyazawa |

(56) References Cited

U.S. PATENT DOCUMENTS

| | | |
|---|---|---|
| 2007/0111833 A1 | 5/2007 | Young |
| 2007/0129193 A1 | 6/2007 | Nonoshita et al. |
| 2007/0137425 A1 | 6/2007 | Dal et al. |
| 2007/0173364 A1 | 7/2007 | Renshaw |
| 2007/0186718 A1 | 8/2007 | Chiang |
| 2007/0199403 A1 | 8/2007 | Ciavatta et al. |
| 2007/0227293 A1 | 10/2007 | Valle |
| 2007/0227294 A1 | 10/2007 | Valle |
| 2007/0265122 A1 | 11/2007 | Emura et al. |
| 2007/0270261 A1 | 11/2007 | Sakura et al. |
| 2007/0283781 A1 | 12/2007 | Meggiolan |
| 2008/0028887 A1 | 2/2008 | Valle et al. |
| 2008/0120845 A1 | 5/2008 | Hama |
| 2008/0176691 A1 | 7/2008 | Saifuddin et al. |
| 2008/0202284 A1 | 8/2008 | Valle et al. |
| 2008/0207369 A1 | 8/2008 | Bouchez |
| 2008/0272572 A1 | 11/2008 | Tsai |
| 2008/0314193 A1 | 12/2008 | Meggiolan |
| 2009/0042681 A1 | 2/2009 | Dal et al. |
| 2009/0042682 A1 | 2/2009 | Dal et al. |
| 2009/0105024 A1 | 4/2009 | Sakura et al. |
| 2009/0236777 A1 | 9/2009 | Chiang |
| 2009/0243160 A1 | 10/2009 | Chiang |
| 2009/0247337 A1 | 10/2009 | Sakura et al. |
| 2010/0064845 A1 | 3/2010 | French |
| 2010/0093494 A1 | 4/2010 | Smith |
| 2010/0326233 A1 | 12/2010 | Schlanger |
| 2011/0126666 A1 | 6/2011 | Mcainsh |
| 2011/0167943 A1* | 7/2011 | Lermen ................ B62M 11/145 74/331 |
| 2011/0251008 A1* | 10/2011 | Schmitz ................ B62M 11/06 475/149 |
| 2011/0319209 A1 | 12/2011 | Huang et al. |
| 2012/0172165 A1* | 7/2012 | Schroedl ................ B62M 9/02 29/893.1 |
| 2013/0011215 A1 | 1/2013 | Wells |
| 2013/0087013 A1 | 4/2013 | Sugimoto et al. |
| 2013/0139642 A1 | 6/2013 | Reiter et al. |
| 2013/0184110 A1 | 7/2013 | Reiter |
| 2014/0335987 A1 | 11/2014 | Iwai et al. |
| 2015/0082939 A1 | 3/2015 | Meyer et al. |
| 2015/0152231 A1 | 6/2015 | Ohki et al. |
| 2015/0175241 A1 | 6/2015 | Malloy |
| 2015/0176692 A1 | 6/2015 | Roh |
| 2015/0198231 A1 | 7/2015 | Emura |
| 2015/0210352 A1 | 7/2015 | Sugimoto |
| 2015/0210353 A1 | 7/2015 | Tokuyama et al. |
| 2015/0211623 A1 | 7/2015 | Inui |
| 2015/0217834 A1 | 8/2015 | Iwai et al. |
| 2015/0337943 A1 | 11/2015 | Sugimoto |
| 2015/0360749 A1 | 12/2015 | Iwai et al. |
| 2015/0362057 A1 | 12/2015 | Wesling et al. |
| 2016/0114859 A1 | 4/2016 | Tsai et al. |
| 2016/0272279 A1 | 9/2016 | Yoshida et al. |
| 2017/0029066 A1 | 2/2017 | Fukunaga et al. |
| 2017/0146109 A1 | 5/2017 | Reiter et al. |
| 2017/0174288 A1 | 6/2017 | Wu |
| 2017/0183060 A1 | 6/2017 | Braedt |
| 2017/0234418 A1 | 8/2017 | Barefoot et al. |
| 2017/0247081 A1 | 8/2017 | Sugimoto |
| 2017/0274960 A1 | 9/2017 | Dubois et al. |
| 2017/0292598 A1 | 10/2017 | Moore et al. |
| 2018/0037296 A1 | 2/2018 | Hamamoto |
| 2018/0043203 A1 | 2/2018 | Seol |
| 2018/0057106 A1 | 3/2018 | Iwai et al. |
| 2018/0079467 A1 | 3/2018 | Hirose et al. |
| 2018/0127057 A1 | 5/2018 | Sugimoto |
| 2018/0134340 A1 | 5/2018 | Emura |
| 2018/0231060 A1 | 8/2018 | Milanesio et al. |
| 2018/0347680 A1 | 12/2018 | Akanishi |
| 2018/0362113 A1 | 12/2018 | Day |
| 2019/0017586 A1 | 1/2019 | Sugimoto |
| 2019/0085899 A1 | 3/2019 | Bernardele |
| 2019/0152558 A1 | 5/2019 | Staples et al. |
| 2019/0185108 A1 | 6/2019 | Bush et al. |
| 2019/0210677 A1 | 7/2019 | O'Reilly |
| 2020/0200253 A1 | 6/2020 | Klawer et al. |
| 2020/0256446 A1 | 8/2020 | Klawer et al. |
| 2021/0094652 A1 | 4/2021 | Staples et al. |
| 2023/0111794 A1 | 4/2023 | Lee et al. |

FOREIGN PATENT DOCUMENTS

| | | |
|---|---|---|
| CN | 200999089 Y | 1/2008 |
| CN | 101224782 A | 7/2008 |
| CN | 103133637 A | 6/2013 |
| CN | 107380340 A | 11/2017 |
| DE | 3130258 A1 | 6/1982 |
| DE | 3531030 A1 | 3/1987 |
| DE | 19751879 A1 | 5/1999 |
| DE | 19954432 A1 | 5/2001 |
| DE | 20218755 U1 | 2/2003 |
| DE | 102015005673 A1 | 11/2015 |
| DE | 202017107695 U1 | 3/2018 |
| EP | 0144984 B1 | 4/1989 |
| EP | 0538780 A1 | 4/1993 |
| EP | 1270393 A1 | 1/2003 |
| EP | 1281609 A2 | 2/2003 |
| EP | 1352825 A1 | 10/2003 |
| EP | 1426282 A2 | 6/2004 |
| EP | 1493654 A1 | 1/2005 |
| EP | 1619417 A2 | 1/2006 |
| EP | 1884460 A2 | 2/2008 |
| EP | 1884461 A2 | 2/2008 |
| EP | 2423091 A1 | 2/2012 |
| ES | 2600778 A1 | 2/2017 |
| FR | 904975 A | 11/1945 |
| FR | 946276 A | 5/1949 |
| FR | 2501615 B1 | 4/1986 |
| GB | 2005363 B | 6/1982 |
| JP | H10181662 A | 7/1998 |
| JP | 2005053410 A | 3/2005 |
| TW | 200821216 A | 5/2008 |
| TW | 201530021 A | 8/2015 |
| WO | 2007147909 A1 | 12/2007 |
| WO | 2010136135 A1 | 12/2010 |

OTHER PUBLICATIONS

Chinese Second Action and Search Report, App No. 2020011439469.7, 16 Pages, Dated Mar. 8, 2022.
Chinese Third Action and Search Report, App No. 2020011439469.7, 7 Pages, Dated Aug. 18, 2022.
Chinese First Action and Search Report, App No. 201710232829.8, 12 Pages, Dated Feb. 3, 2020.
European Examination Report, European Patent Application No. 17166123.4, 10 Pages, Dated Mar. 18, 2020.
Google Translation of Decision of Rejection for TW Appl. No. 106112061, Feb. 26, 2018 (Year: 2018).
Google Translation of Rejection for TW Appl. No. 106112061, Jul. 30, 2018 (Year: 2018).
Inverted trapezoid—Google Search, Oct. 4, 2019, (Year: 2019).
Machine Translation of Chinese First Action and Search Report, Appl. No. 201710232829.8, Feb. 3, 2020 (Year: 2020).
European Search Report, European Patent Application No. 17166123.4, Oct. 5, 2017, 9 Pages.
Decision of Rejection for TW Application No. 106112061 pp. 8, Feb. 26, 2018.
Decision of Rejection for TW Application No. 106112061 pp. 10, Jul. 30, 2018.
Chinese Fourth Action and Search Report, App No. 2020011439469.7, 24 Pages, Dated Feb. 20, 2023.
Tang, et al., "Guide for Designers of Plastic Articles", Sep. 30, 1993, p. 175.

* cited by examiner

MID-SPROCKET ASSEMBLY

CROSS-REFERENCE TO RELATED APPLICATIONS (PROVISIONAL)

This application claims priority to and benefit of co-pending U.S. Provisional Patent Application No. 62/773,983 filed on Dec. 7, 2018, entitled "MID-SPROCKET ASSEMBLY" by Evan Michael Choltco-Devlin, and assigned to the assignee of the present application, the disclosure of which is hereby incorporated by reference in its entirety.

FIELD OF THE INVENTION

Embodiments of the invention generally relate to a mid-sprocket assembly for a bicycle.

BACKGROUND

In a bicycle, such as a mountain bike (or the like) that has a number of gears in a cassette in the rear and a chainring in the middle, there can be a significant amount of vibration, suspension flex, cross-chaining, and other detrimental actions that can cause roller chain disengagement. For example, as the roller chain moves to the peripheral gears on the rear cassette, there is an increase in the lateral angle at which the roller chain approaches the chainring. These different approach angles can deleteriously affect the ability of the traditional chainring to retain the roller chain thereby resulting in roller chain disengagement.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

The disclosed mid-sprocket assembly also increases chain retention capabilities by removing the alignment relationship between the sprocket and the rear drive gear as the different gears are no longer on the rear cassette, but are instead part of the mid-sprocket assembly.

Figure 1:
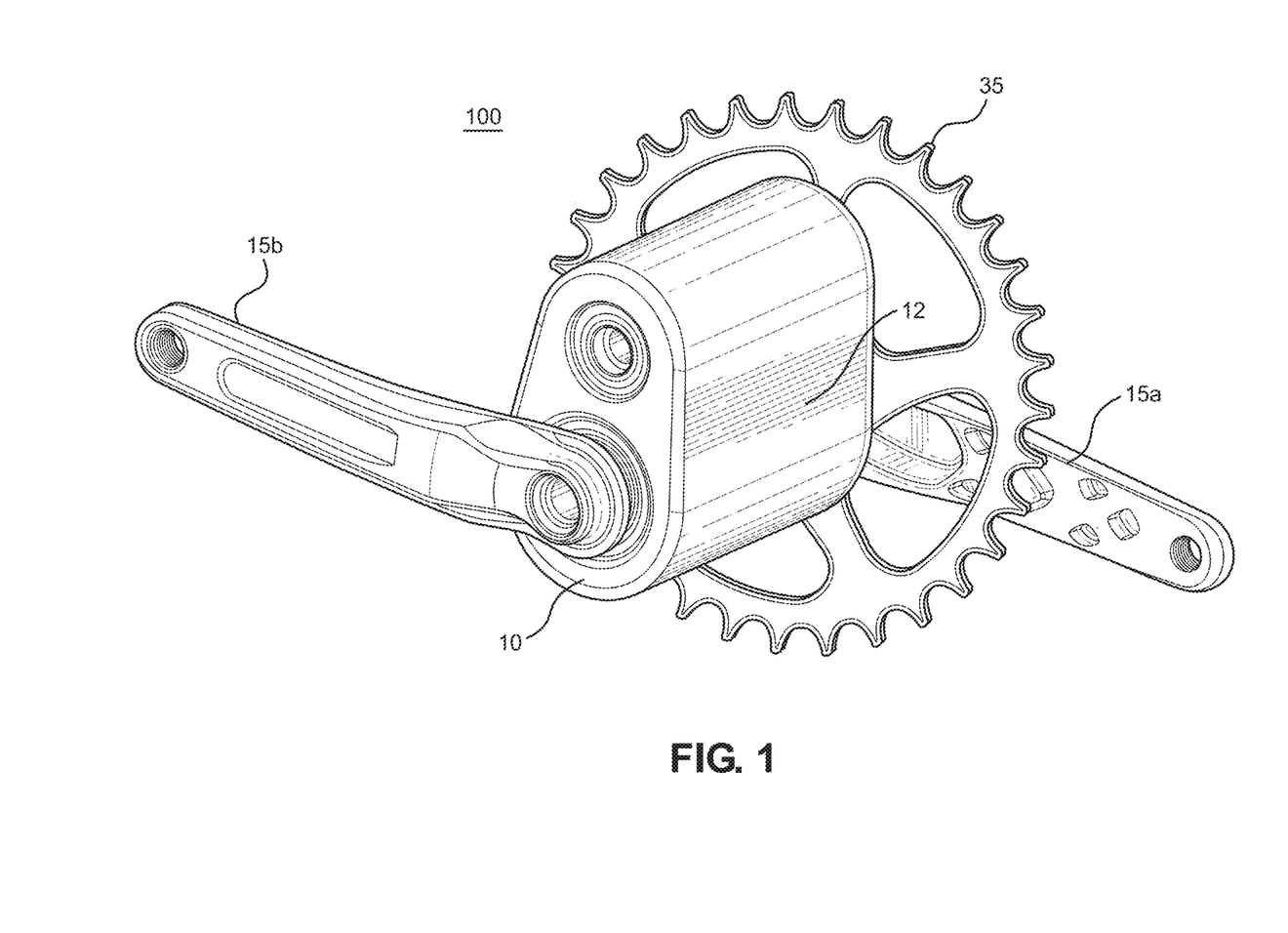
FIG. 1 is an orthogonal view of a mid-sprocket assembly, in accordance with an embodiment.

Referring now to FIG. 1, an orthogonal view 100 of a mid-sprocket assembly 10 is shown in accordance with an embodiment. Mid-sprocket assembly 10 is shown in conjunction with a left-hand non-drive crank arm 15b, a right-hand drive side crank arm 15a, and a chainring 35. In general, mid-sprocket assembly 10 is mounted into some number of modular interfaces in a bicycle frame and does both the power transmission and the gear shifting actions that is normally split up into a crankset at the front end and a derailleur at the rear wheel including a derailleur cassette cog cluster and chain.

Although a chainring 35 is shown, it is merely one of a plurality of ways for the mid sprocket assembly 10 to provide drive to the rear wheel. In one embodiment, instead of a chainring, there could be a belt cog, a chain cog, or the like to provide final drive to the rear wheel. Mid-sprocket assembly 10 also includes a shifting mechanism 12 at the center panel of the mid-sprocket assembly 10 that allows the shifting from a shifter (or shifters) at the handlebars (or other location) that is manipulated by the rider to shift the internal gears within the mid-sprocket assembly 10.

Figure 2:
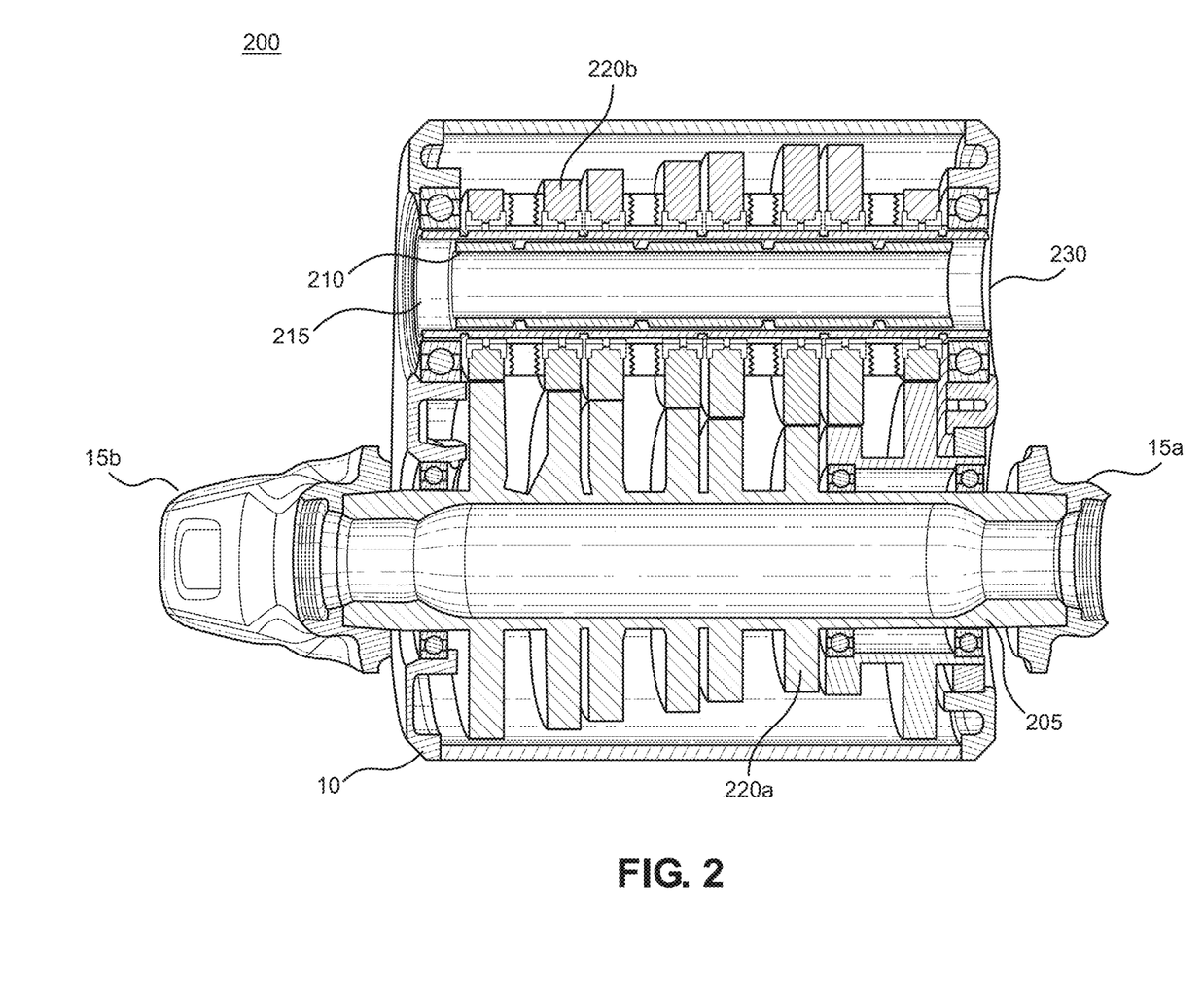
FIG. 2 is a sectional view of the mid-sprocket assembly, in accordance with an embodiment.

With reference now to FIG. 2, a sectional view 200 of the mid-sprocket assembly 10 is shown in accordance with an embodiment. In one embodiment, mid-sprocket assembly 10 includes an input shaft 205 (connected to the crank arms 15a and 15b) with one or more gears 220a directly attached to it and a countershaft 215 and a shifting shaft 210 that is selectively choosing which gear 220b is engaged to the countershaft 215. In one embodiment, in the case of spur gear driven assemblies there is a need for a third shaft 230 (the top shaft) to reverse the direction back to the appropriate direction. E.g., if the bike is being pedaled forward, the countershaft 215 is rotating backwards, and the third shaft 230 is needed to translate that power back into the forward direction. In one embodiment, the third shaft 230 is concentric about the countershaft 215. In another embodiment, the third shaft 230 is concentric about the input shaft 205. Although gears are shown, it should be appreciated that the power transmission could be performed with belts, chains, spur gears, etc. and any number of shafts could be utilized.

In one embodiment, power is input through the input shaft 205 (via the crank arms 15a and 15b, a motor, etc.), translated through all of the gears 220a and 220b to the countershaft 215, where one of the gears 220b on the countershaft 215 is selectively engaged to transfer the power into the countershaft 215 and then back out of the countershaft 215 into the output shaft (e.g., third shaft 230) which will have an output gear selected for use to provide the drive to the rear wheel. In another embodiment, the mid-sprocket assembly 10 does not include an output shaft and instead the power is transferred to the rear wheel directly from the countershaft 215. For example, In the case of an internal belt or chain drive where the drive is not reversed, it could be advantageous to have the output be direct from the countershaft 215 to differently direct chain forces on a bike to tune anti-squat characteristics and to simplify the internals of the mid-sprocket assembly 10.

Figure 3:
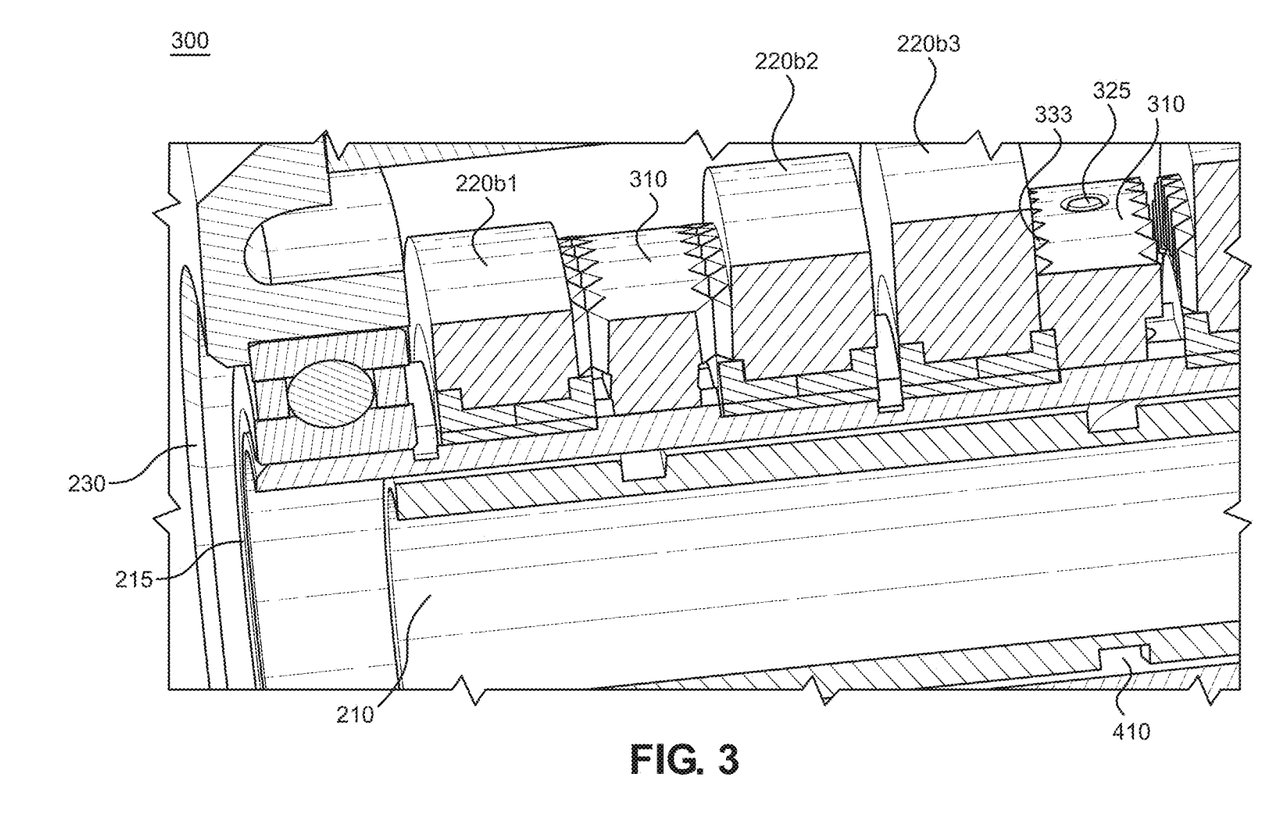
FIG. 3 is a sectional view of the gear engagement/disengagement of the mid-sprocket assembly, in accordance with an embodiment.

Referring now to FIG. 3, a sectional view 300 of the gear engagement/disengagement of the mid-sprocket assembly is shown in accordance with an embodiment.

Present gearbox assemblies use radially acting pawls with a radial interface, that are selectively engaged. However, because of the radial space restrictions of a gearbox, the pawls are housed centrally inside the countershaft. In this configuration, the gearbox does not shift well under load. Instead, some amount of decrease in the amount of input torque is needed to move the gear out of the gear that it is currently in and into the new chosen gear. Normally, all of the gears are always engaged, and the gear selection refers to which of the gears will be linked to the countershaft so that the power can be transferred to the countershaft and then out through the output shaft. In many cases, they are done with radial pawls which don't like moving when they are under load.

However, in the mid-sprocket assembly 10, a mechanism is used where each of pawls have spaces or shift rings 310 such as in FIG. 3 where gear 220b3 (and not gears 220b1 or 220b2) is engaged. In one embodiment, each of the shift rings 310 have pawl space angles and spaces that can vary. Moreover, the pawl geometry on the shift rings 310 has a design such that under-load they always want to disengage. Thus, the natural state of the shift rings 310 would be a neutral or disengaged state. The shifting shaft 210 inside the countershaft 215 utilizes a cam feature (as shown by the cam pin 325) that interfaces with a camming slots 410 feature in the shift shaft 210 which holds the shift rings 310 in place.

Figure 4:
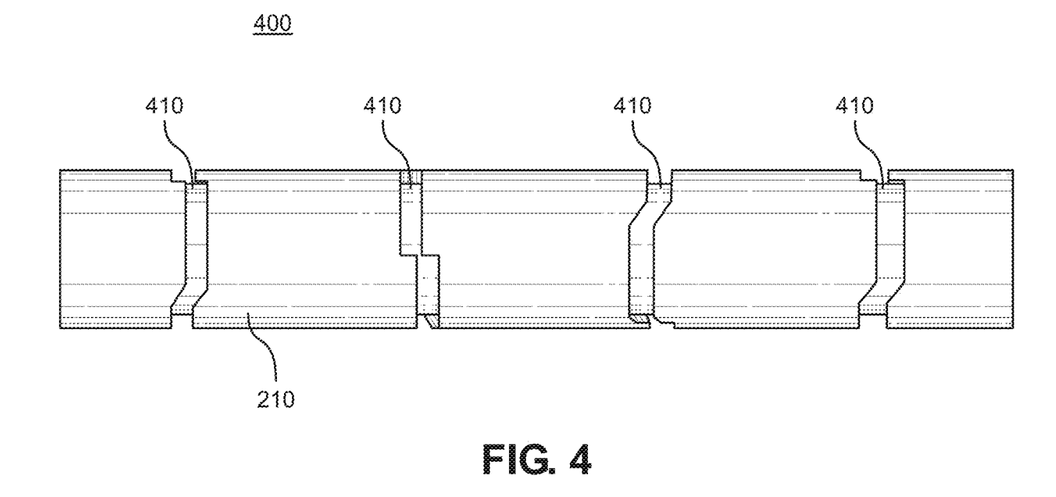
FIG. 4 is a side view of the shifting shaft including the camming slot features, in accordance with an embodiment.

Referring now to FIG. 4, a side view 400 of the shifting shaft 210 including the camming slots 410 is shown in accordance with an embodiment. In general, camming slots 410 on shifting shaft 210 are offset accordingly to engage the appropriate (or different) shift rings 310 based upon the orientation of shifting shaft 210.

In the prior art, a pawl is locked in under load such that an attempt to change the gearing under load is difficult, if not impossible, and is likely to damage the pawl, wear out the gears, etc. In other words, the prior art pawls have a desire to remain engaged. While the embodiments disclosed herein have a natural resting state that is neutral or disengaged.

In one embodiment, (as shown in FIG. 2) shifting shaft 210 is retained from shifting right or left axially with a retaining feature (angular contact ring, or thrust bearing) on either end of the shifting shaft 210 that could be a bearing or the like that will hold the shifting shaft 210 with an amount of force that can also allow shifting shaft 210 to move axially based on the camming slots 410.

Figure 5:
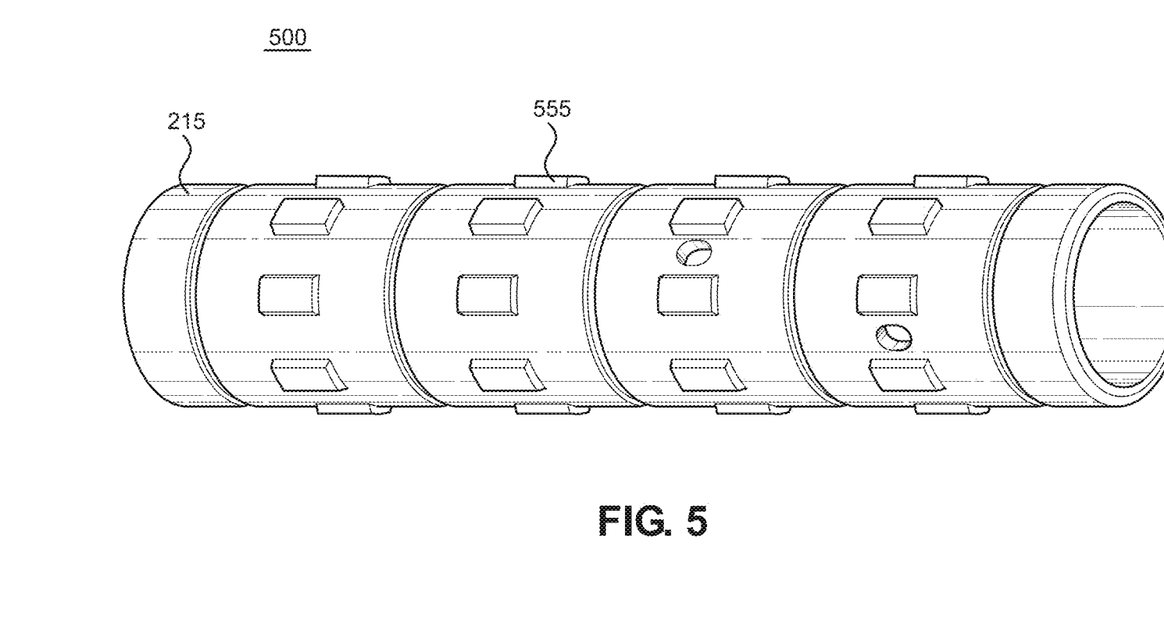
FIG. 5 is an orthogonal view of the countershaft that includes the teeth for engaging with the interior splines of a shift ring, in accordance with an embodiment.

With reference now to FIG. 5, an orthogonal view 500 of countershaft 215 that includes the teeth 555 for engaging with the interior splines 655 of a shift ring 310 is shown in accordance with an embodiment. In one embodiment, the protrusions from the counter shaft only move axially in relation to the shift ring 310. Further, the mating faces on each of the shift ring could be referred to herein as either "splines" or "pawls." In one embodiment, the bushing on the gear rings are slotted so that they can pass over the splines 655 during assembly and then spin freely around the shifting shaft 210 once in the correct places axially.

Figure 6A:
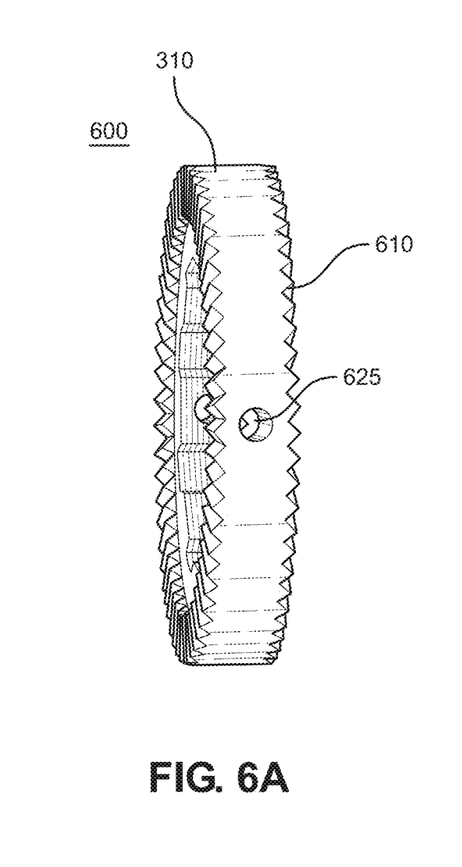
FIG. 6A is an orthogonal view of a shift ring with pawls and a cam pin hole, in accordance with an embodiment.
Figure 6B:
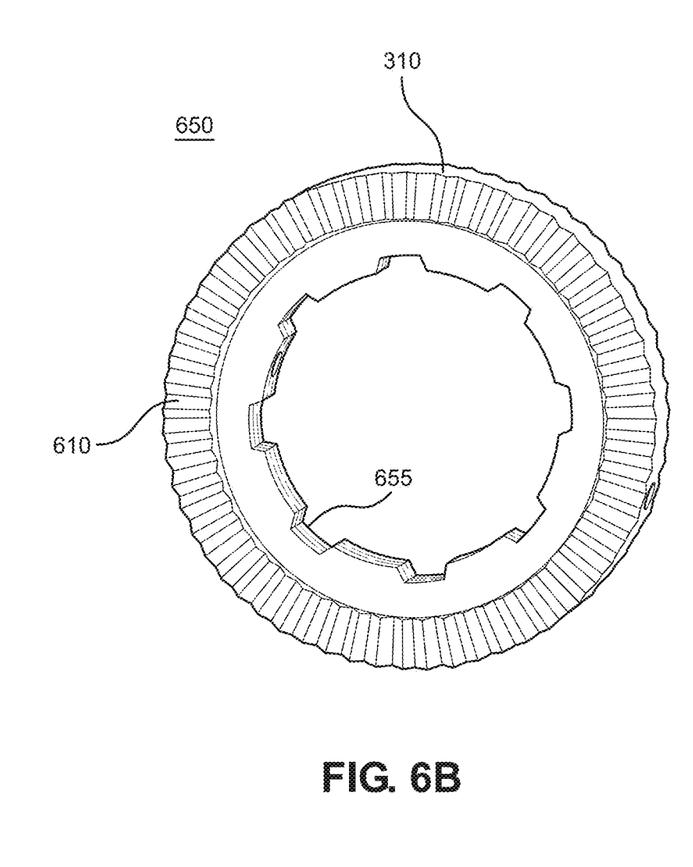
FIG. 6B is a side view of the shift ring with side teeth/pawls for engagement with the gear ring and inner circumference splines for engagement with the countershaft, in accordance with an embodiment.

Referring now to FIG. 6A, an orthogonal view 600 of a shift ring 310 with side pawls 610 for engaging with gears 220b and a cam pin hole 625 for engagement with cam pin 325 is shown in accordance with an embodiment. With reference now to FIG. 6B, a side view 650 of the shift ring 310 with side pawls 610 (or teeth) for engagement with gears 220b and inner circumference splines 655 for engagement with teeth 555 of countershaft 215 is shown in accordance with an embodiment.

In one embodiment, unlike a radial pawl gear ring that may have 10-24 pawls, the present axial embodiment has 60 pawls 610 on the shift rings 310. In one embodiment, there may be a similar number and shape of the pawls on the gears 220b. Thus, the amount of play during a shift when there is a disengagement of a first gear and an engagement of another different gear is significantly reduced. For example, the number of pawls divided by 360 provides the number of degrees of free play during a gear shifting process. In a prior art 24 pawl gear ring, the amount of free play would be 15 degrees that would occur during a disengagement of a first gear ring and the engagement of a second gear ring. In contrast, in the present 60 pawl 610 shift ring 310 there would only be 6 degrees of free play during a gear ring change situation, e.g., a disengagement of a first gear ring and the engagement of a second gear ring.

In one embodiment, because of the additional number of pawls 610, there is also a force reduction between the pawl interfaces 333 as shown in FIG. 3. That is, the force on the shift rings 310 and gears 220b is shared across the 60 pawl 610.

In one embodiment, because of the resting neutral aspects of each shift ring 310 and the configuration of gears 220b, the face of the pawls 610 can be sharp on both sides (e.g., a steep face angle on each side). Which allows the pawls to be much smaller in size and therefore capable of having more pawls 610 on shift rings 310 and gears 220b (as they do not need to have a shallow face on one side of the pawls 610 to deal with a free rotating need of a prior-art gear ring). Although a number of pawls 610 is shown, the number of pawls 610 could be different. Moreover, although a shape of the pawls 610 faces is shown, the faces could be different to provide different friction/retaining characteristics.

In one embodiment, because the pawl faces on the shift rings and gears are symmetric, the gears 220b could be set to be loaded even when the input from the pedals is backwards which would allow the mid-sprocket assembly 10 to become a direct drive. In one embodiment, the freewheel could only be at the rear hub instead of at the mid-sprocket assembly 10 which would reduce the weight, complexity, and the like of the mid-sprocket assembly.

In one embodiment, the rear hub could be a direct drive hub and the mid-sprocket assembly 10 could include the freewheel capability to reduce the weight, size, complexity of the rear wheel of the bike.

In one embodiment, because of the symmetry of the pawls 610 on the shift rings 310 and the gears 220b, the different freewheel and direct drive configurations described above could be made by the simple swapping out different rear wheels and/or making an adjustment to the mid-sprocket assembly. In so doing, a rider could make a quick pit-stop and change a bike to any of the different configurations.

In one embodiment, the main driving torque of the system is carried by the splines in the countershaft directly. In one embodiment, shift rings 310 are transferring a force into the countershaft via the shaft pin, while the remaining gears are spinning on the spline free portion about the countershaft.

Although a number of components are shown in the above figures, it should be appreciated that the components of the mid-sprocket assembly could be fixed or could be interchangeable. For example, a given gear ring could be changed, a plurality of gear rings could be changed, similarly, the countershaft, shift ring, cam pins, and the like could also be fixed or interchangeable to allow for different gearing scenarios, different gear numbers, etc. Further, one or more of the components could be adjusted, modified, removed, added, or exchanged for personal reasons, for performance reasons, for different applications (e.g., road, downhill, offroad, uphill, etc.), for different size bike frames, different crank arms, different chainring designs, and the like.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments could be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A mid-sprocket assembly comprising:
   an input shaft to receive an input force,
      the input shaft having a plurality of input shaft gears coupled therewith; and
   a countershaft having a plurality of countershaft gears coupled therewith,
      at least one of the plurality of countershaft gears selectively and axially engaged to receive the input force from at least one of the plurality of input shaft gears and provide an output force to a drive wheel of a vehicle;
   a shifting mechanism, the shifting mechanism comprising:
      a shifting shaft within the mid-sprocket assembly, the shifting shaft coupleable with at least one of the plurality of countershaft gears on the countershaft, said shifting shaft further comprising:
         a plurality of shift rings coupled therewith, the plurality of shift rings interspersed within said plurality of countershaft gears, the plurality of shift rings having varying spaces and space angles, each of the plurality of shift rings comprising:
            a shift ring cam pin hole,
            the shift ring cam pin hole to receive a cam pin, the cam pin to couple at least one of the plurality of shift rings with the input shaft via an input shaft cam pin hole on said input shaft; and
         a shifter located away from said mid-sprocket assembly, the shifter communicatively coupled with the shifting shaft, a manipulation of the shifter causes the shifting shaft to select one of said at least one of said plurality of countershaft gears to engage with said at least one of the plurality of input shaft gears wherein each of said plurality of shift rings has a pawl geometry which is configured such that, when one of said plurality of shift rings is under load, said one of said plurality of shift rings will have a natural resting state of disengagement in order to facilitate shifting when under load.

2. The mid-sprocket assembly of claim 1, wherein the drive wheel of the vehicle is a rear wheel of the vehicle.

3. The mid-sprocket assembly of claim 1, further comprising:
   an output shaft to receive the output force from at least one of the plurality of countershaft gears;
   a chainring coupled with the output shaft; and
   a chain rotatably coupled with the chainring,
      the chain to transfer the output force from the chainring to the drive wheel of the vehicle.

4. The mid-sprocket assembly of claim 1, further comprising:
   an output shaft to receive the output force from at least one of the plurality of countershaft gears;
   a belt cog coupled with the output shaft; and
   a belt rotatably coupled with the belt cog,
      the belt to transfer the output force from the belt cog to the drive wheel of the vehicle.

5. The mid-sprocket assembly of claim 1, further comprising:
   each of the plurality of countershaft gears having a countershaft pawl interface on one side thereof; and
   each of the plurality of shift rings further comprising:
      a shift pawl interface on at least one side thereof,
         said shift pawl interface of at least one of said plurality of shift rings engages with said countershaft pawl interface of one countershaft gear to engage said countershaft with said input shaft.

6. A method of transmitting a force received from a drive component to a drive wheel of a vehicle via a mid-sprocket assembly, the method comprising:
   receiving an input force from a drive component to at least one input shaft gear of an input shaft,
      the input shaft having a plurality of input shaft gears coupled therewith;
   transferring the input force from the input shaft to at least one countershaft gear of a countershaft,
      the countershaft having a plurality of countershaft gears coupled therewith;
   generating an output force from the countershaft, the output force generated from the input force transferred from the input shaft;
   providing a shifting shaft within the mid-sprocket assembly; and
   communicatively coupling a shifter with the shifting shaft, the shifter located away from said mid-sprocket assembly; and
   manipulating the shifter causes the shifting shaft to engage with said input shaft and said countershaft;
   providing an input shaft cam pin hole on said input shaft;
   providing a countershaft pawl interface on one side of each of the plurality of countershaft gears; and
   coupling a plurality of shift rings with the shifting shaft, the plurality of shift rings interspersed within said plurality of countershaft gears, the plurality of shift rings having varying spaces and space angles,
   each of the plurality of shift rings comprising:
      a shift ring cam pin hole,
      utilizing a cam pin to couple at least one of the plurality of shift rings with said input shaft;
      each of the plurality of shift rings further comprising:
         a shift pawl interface on at least one side thereof; and
         utilizing said shift pawl interface to engage with said countershaft pawl interface thereby coupling at least one of the plurality of shift rings with at least one of said plurality of countershaft gears; and
   providing the output force to a drive wheel of a vehicle, wherein each of said plurality of shift rings has a pawl geometry which is configured such that, when one of said plurality of shift rings is under load, said one of said plurality of shift rings will have a natural resting state of disengagement in order to facilitate shifting when under load.

7. The method of claim 6 wherein transferring the input force further comprises:
   selectively and axially engaging at least one of the plurality of countershaft gears with at least one of the plurality of input shaft gears; and
   transferring the input force to one of the plurality of countershaft gears from one of the plurality of input shaft gears.

8. The method of claim 6, wherein the drive wheel of the vehicle is a rear wheel of the vehicle.

9. The method of claim 6, further comprising
   providing the output force from the countershaft to an output shaft;
   coupling a chainring with the output shaft;
   providing a chain to couple the chainring with the drive wheel; and
   utilizing the chain to transfer the output force from the chainring to the drive wheel of the vehicle.

10. The method of claim 6, further comprising
    providing the output force from the countershaft to an output shaft;
    coupling a belt cog with the output shaft;
    providing a belt to couple the belt cog with the drive wheel; and
    utilizing the belt to transfer the output force from the belt cog to the drive wheel of the vehicle.

11. A mid-sprocket assembly comprising:
    an input shaft to receive an input force,
       the input shaft having a plurality of input shaft gears coupled therewith; and
    a countershaft having a plurality of countershaft gears coupled therewith,
       at least one of the plurality of countershaft gears selectively and axially engaged to receive the input force from at least one of the plurality of input shaft gears and provide an output force;
    an output shaft to receive the output force from at least one of the plurality of countershaft gears, and transfer the output force to a drive wheel of a vehicle;
    a shifting shaft within the mid-sprocket assembly;
    a shifter located away from said mid-sprocket assembly, the shifter communicatively coupled with the shifting shaft,
    a manipulation of the shifter causes the shifting shaft to engage with one of said plurality of countershaft gears;
    wherein said shifting shaft further comprises:
       a plurality of shift rings coupled therewith, the plurality of shift rings interspersed within said plurality of countershaft gears, the plurality of shift rings having varying spaces and space angles,
    each of the plurality of shift rings comprising:
       a shift ring cam pin hole, the shift ring cam pin hole to receive a cam pin, the cam pin to couple at least one of the plurality of shift rings with the input shaft via an input shaft cam pin hole on said input shaft, wherein each of said plurality of shift rings has a pawl geometry which is configured such that, when one of said plurality of shift rings is under load, said one of said plurality of shift rings will have a natural resting state of disengagement in order to facilitate shifting when under load.

12. The mid-sprocket assembly of claim 11, further comprising:
    a chainring coupled with the output shaft; and
    a chain rotatably coupled with the chainring,
       the chain to transfer the output force from the chainring to the drive wheel of the vehicle.

13. The mid-sprocket assembly of claim 11, further comprising:
    a belt cog coupled with the output shaft; and
    a belt rotatably coupled with the belt cog,
       the belt to transfer the output force from the belt cog to the drive wheel of the vehicle.

14. The mid-sprocket assembly of claim 11, further comprising:
    each of the plurality of countershaft gears having a countershaft pawl interface on one side thereof; and
    each of the plurality of shift rings further comprising:
       a shift pawl interface on at least one side thereof,
          said shift pawl interface of at least one of said plurality of shift rings engages with said countershaft pawl interface of one countershaft gear to engage said countershaft with said input shaft.

* * * * *